United States Patent [19]

Gareiss et al.

[11] Patent Number: 5,422,390
[45] Date of Patent: * Jun. 6, 1995

[54] FLAMEPROOFED THERMOPLASTIC COPOLYESTER MOLDING MATERIALS

[75] Inventors: Brigitte Gareiss, Ludwigshafen; Christoph Plachetta, Limburgerhof; Karlheinz Ulmerich, Carlsberg; Gunter Pipper, Bad Duerkheim, all of Germany

[73] Assignee: BASF Aktiengesellschaft, Ludwigshafen, Germany

[*] Notice: The portion of the term of this patent subsequent to Mar. 29, 2011 has been disclaimed.

[21] Appl. No.: 233,704

[22] Filed: Apr. 26, 1994

[30] Foreign Application Priority Data

May 7, 1993 [DE] Germany ............... 43 15 208.2

[51] Int. Cl.$^6$ ............................................. C08K 3/26
[52] U.S. Cl. ............................... 524/425; 524/424
[58] Field of Search ............ 528/295.3; 524/424, 524/425

[56] References Cited

U.S. PATENT DOCUMENTS

| | | | |
|---|---|---|---|
| Re. 31,270 | 6/1983 | Tung | 528/295.3 |
| 3,339,013 | 8/1967 | Gainer et al. | 524/424 |
| 3,468,839 | 9/1969 | Millane | 524/424 |
| 4,131,595 | 12/1978 | Breitenfelner et al. | |
| 4,439,598 | 3/1984 | Sublett et al. | 528/295.3 |
| 5,057,367 | 10/1991 | Morii et al. | 524/425 |
| 5,298,547 | 3/1994 | Gareiss et al. | 524/425 |

FOREIGN PATENT DOCUMENTS

| | | |
|---|---|---|
| 12578 | 6/1980 | European Pat. Off. |
| 53-000251 | 1/1978 | Japan . |
| 53-92855 | 8/1978 | Japan . |
| 53-104650 | 9/1978 | Japan . |
| 54-37152 | 3/1979 | Japan . |

*Primary Examiner*—Veronica P. Hoke
*Attorney, Agent, or Firm*—Keil & Weinkauf

[57] ABSTRACT

Thermoplastic molding materials contain, as essential components,

A) 10-80% by wt. of a copolyester based on polyalkylene terephthalates, which contains from 5 to 25% by weight, based on A), of a dimeric acid of 7 to 52 carbon atoms as a co-component, and B) 20-70% by wt. of a mixture of carbonates of metals of the 2nd main group of the Periodic Table of Elements.

9 Claims, No Drawings

FLAMEPROOFED THERMOPLASTIC COPOLYESTER MOLDING MATERIALS

The present invention relates to thermoplastic molding materials containing, as essential components,
A) 10–80% by wt. of a copolyester based on polyalkylene terephthalates, which contains from 5 to 25% by weight, based on A), of a dimeric acid of 7 to 52 carbon atoms as a co-component, and
B) 20–70% by wt. of a mixture of carbonates of metals of the 2nd main group of the Periodic Table of Elements.

The present invention furthermore relates to the use of these thermoplastic moldings and to the moldings obtainable from the thermoplastic molding materials.

Thermoplastic polyesters are used in many different areas, for example in the automotive sector, for the production of housings for electrical appliances or in the building sector.

For many applications, it is necessary to flameproof the polyester molding materials. Conventional flameproofing agents, such as $Al(OH)_3$ or $Mg(OH)_2$, are unsuitable for polyesters since they either lead to a decrease in the molecular weight of the polymer or are thermally unstable at the corresponding processing temperatures.

Accordingly, the recent European Patent Application 92 119 257 proposes using mixtures of carbonates of metals of the 2nd main group as flameproofing agents for polyesters.

DE-A 3 446 244, DE-A 27 07 852 and DE-A 29 24 895 disclose the improvement of the mechanical properties of polyester molding materials, copolyesters based on aliphatic dicarboxylic acids, if necessary as a mixture with polybutylene terephthalate, being used.

Owing to the high filler content required for effective flame-proofing, the mechanical properties are no longer adequate for many applications. In particular, the elongation at break and the toughness are dramatically reduced. These disadvantages also apply to polyester molding materials in which glass fibres are incorporated as a filler. Although the replacement of polyethylene terephthalates by prior art copolyesters improves the mechanical properties to a slight extent, said properties are unsatisfactory at high filler contents.

It is an object of the present invention to provide flameproof thermoplastic polyester molding materials which simultaneously have good mechanical properties, in particular good elongation at break and impact strength.

We have found that this object is achieved by the thermoplastic molding materials defined at the outset.

We have also found the use of said materials for the production of fibers, films and moldings and the moldings obtainable from the thermoplastic molding materials.

Surprisingly, the novel molding materials having high filler contents exhibit a synergistic improvement in the mechanical properties in combination with good flameproof properties.

The novel molding materials contain, as component A), from 10 to 80, preferably from 20 to 70, in particular from 25 to 60,% by weight of a copolyester based on polyalkylene terephthalates which contains from 5 to 25, preferably from 10 to 15,% by weight, based on A), of a dimeric acid of 7 to 52 carbon atoms.

Such polyalkylene terephthalates are known per se. The aromatic ring may also be substituted, for example by halogen, such as chlorine or bromine, and/or by $C_1$–$C_4$-alkyl, eg. methyl, ethyl, isopropyl, n-propyl, isobutyl, n-butyl or tert-butyl.

A small proportion of the terephthalic acid may be replaced by other aliphatic and aromatic dicarboxylic acids, which may also be used as a mixture. Naphthalenedicarboxylic acids, isophthalic acid, adipic acid, azelaic acid, sebacic acid, dodecanedioic acid and cyclohexanedicarboxylic acids, mixtures of these carboxylic acids and ester-forming derivatives thereof may be mentioned here only by way of example and may be used in amounts of up to 10, preferably 5,% by weight, based on A).

Preferably used dihydroxy compounds are diols of 2 to 10 carbon atoms, particularly preferably ethylene glycol, 1,3-propanediol, 1,4-butanediol, 1,4-butenediol and 1,6-hexanediol; however, 1,4-hexanediol, 1,4-cyclohexanediol, 1,4-di-(hydroxymethyl)cyclohexane, bisphenol A, neopentylglycol, mixtures of these diols and ester-forming derivatives thereof may also be used.

Polyesters of terephthalic acid and of a $C_2$–$C_6$-diol component, eg. polyethylene terephthalate, polyethylene naphthalate, polypropylene terephthalate or polybutylene terephthalate or mixtures thereof, are particularly preferably used for synthesizing the copolyester A).

The dimeric acids used according to the invention as co-components of the polyester are to be understood as meaning dimerization products of unsaturated fatty acids or of their alkyl esters.

Examples of monounsaturated fatty acids are acrylic acid (C3), crotonic acid (C4), palmitoleic acid (C16), oleic acid (C18) and erucic acid (C22). Examples of diunsaturated fatty acids are sorbic acid (C6) and linoleic acid (C18). Trienoic acids are, for example, linolenic acid (C18) and eleostearic acid (C18). A tetraunsaturated fatty acid is, for example, aracludonic acid (C20) and an example of a pentaunsaturated fatty acid is clupanodonic acid (C22).

Alkyl esters of the unsaturated fatty acids are to be understood as meaning those where the alkyl radical is of 1 to 4 carbon atoms, the methyl esters being preferred.

The preparation and structure of the dimeric acids and their esters are disclosed in Journal of American Oil Chemists Society, 39 (1962), 534–545.

After the dimerization, the dimeric acids or their alkyl esters may still contain double bonds which can be hydrogenated by conventional methods. In general, unsaturated or saturated dimeric acids or alkyl esters may be used as co-components of the polyester, the saturated dimeric acids and their esters being preferred. For the preparation of the dimerization products, identical fatty acids or mixtures of two fatty acids or their esters may used, dimeric acids obtained from fatty acids or their esters having the same number of carbon atoms being preferred.

Preferred dimeric acids are those of 20 to 44, in particular 36 to 44, carbon atoms. C36 dimeric acids of the unsaturated fatty acids of 18 carbon atoms and the dimethyl esters of the C36 dimeric acids are very particularly preferred. Such products are commercially available, eg. Priplast ® from Emery Industries Inc.

The copolyesters can be prepared by reacting the dicarboxylic acids or their ester-forming derivatives with dihydroxy compounds in a manner known per se, and further details are therefore unnecessary.

The novel thermoplastic molding materials contain, as component B), from 20 to 70, preferably from 30 to 60, in particular from 40 to 55,% by weight of a mixture of carbonates of metals of the 2nd main group of the Periodic Table of Elements.

Mixtures of $b_1$) a magnesium calcium carbonate of the general formula $Mg_xCa_y(CO_3)_{x+y}\cdot m\ H_2O$, where x and y are each from 1 to 5, $x/y \geq 1$ and and $m \geq 0$ and $b_2$) a basic magnesium carbonate of the general formula $Mg_n(CO_3)_v(OH)_{2n-2v}\cdot w\ H_2O$, where n is from 1 to 6, v is greater than 0 and less than 6, $n/v > 1$ and $w \geq 0$ have proven particularly suitable, the ratio $b_1$):$b_2$) being from 1:1 to 3:1.

The magnesium calciumcarbonates b1) may be hydrated or anhydrous. The naturally occurring minerals, such as dolomite and huntite, are preferred. An anhydrous form in which x is 3 and y is 1, $Mg_3Ca(CO_3)_4$ (huntite), is particularly preferred.

The basic magnesium carbonates b2) may likewise be used in both hydrated and anhydrous form. Here too, the naturally occurring minerals, such as hydromagnesite, a hydrated compound in which n=5, v=4 and w=4, $Mg_5(CO_3)_4(OH)_2\cdot 4\ H_2O$, are preferred.

The ratio $b_1$): $b_2$) is particularly preferably from 1:1 to 2:1.

In addition to the components A) and B), the novel molding materials may furthermore contain from 0 to 2% by weight of fluorine-containing ethylene polymers. These are polymers of ethylene having a fluorine content of from 55 to 76, preferably from 70 to 76,% by weight.

Examples of these are polytetrafluoroethylene (PTFE), tetrafluoroethylene/hexafluoroethylene copolymers or tetrafluoroethylene copolymers with relatively small amounts (as a rule up to 50% by weight) of copolymerizable ethylenically unsaturated monomers. These are described, for example, by Schildknecht in "Vinyl and Related Polymers", Wiley Publishers, 1952, pages 484 to 494, and by Wall in "Fluoropolymers" (Wiley Interscience, 1972).

These fluorine-containing ethylene polymers are homogeneously distributed in the molding materials and preferably have a particle size $d_{50}$ (number average) of from 0.05 to 1.0 μm, in particular from 0.1 to 5 μm. These small particle sizes can be particularly preferably achieved by using aqueous dispersions of fluorine-containing ethylene polymers and incorporating them into a polyester melt.

The novel thermoplastic molding materials may furthermore contain from 0 to 40% by weight of fibrous or particulate fillers or mixtures thereof, which of course differ from component B). As a rule, these are conventional additives and processing assistants, such as stabilizers, antioxidants, heat stabilizers, colorants, such as dyes and pigments, fibrous and pulverulent fillers and reinforcing agents, nucleating agents, plasticizers, etc.

Examples of antioxidants and heat stabilizers are halides of metals of group I of the Periodic Table of Elements, for example sodium halides, potassium halides and/or lithium halides, if necessary in combination with copper(I) halides, for example chlorides, bromides or iodides, sterically hindered phenols, hydroquinones, aromatic secondary amines, such as diphenylamines, various substituted members of these groups and mixtures thereof, in concentrations of up to 1% by weight, based on the weight of the thermoplastic molding material.

Examples of UV stabilizers, which are generally used in amounts of up to 2% by weight, based on the molding material, are various substituted resorcinols, salicylates, benzotriazoles and benzophenones.

Furthermore, organic dyes, such as nigrosine, and pigments, such as titanium dioxide, cadmium sulfide, cadmium selenide, phthalocyanines, ultramarine blue and carbon black, may be added as colorants, and fibrous and pulverulent fillers and reinforcing agents may also be introduced. Examples of the latter are carbon fibers, glass fibers, amorphous silica, asbestos, calcium silicate (wollastonite), aluminum silicate, magnesium carbonate, kaolin, chalk, powdered quartz, mica and feldspar. The amount of such fillers and colorants is in general up to 40, preferably up to 30, in particular up to 25,% by weight.

Nucleating agents which may be used are, for example, talc, calcium fluoride, sodium phenylphosphinate, alumina and finely divided polytetrafluoroethylene.

Examples of plasticizers are dioctyl phthalate, dibenzyl phthalate, butyl benzyl phthalate, liquid hydrocarbons, N-(n-butyl)benzenesulfonamide and o- and p-tolylethanesulfonamide.

To improve the compatibility with the thermoplastic polyester, minerals and fillers are, if required, treated with an adhesion promoter. Glycidyl-, vinyl- and aminoalkyltrialkoxysilanes are preferred.

The novel thermoplastic molding materials may furthermore contain from 0 to 60, preferably from 0 to 40,% by weight of a polymeric impact modifier (also referred to below as elastomeric polymer or elastomer).

Preferred types of such elastomers are the ethylene/propylene (EPM) and ethylene/propylene/diene (EPDM) rubbers.

EPM rubbers generally have virtually no more double bonds, whereas EPDM rubbers may have from 1 to 20 double bonds per 100 carbon atoms.

Examples of diene monomers for EPDM rubbers are conjugated dienes, such as isoprene and butadiene, non-conjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene or 2-isopropenyl-5-norbornene, and tricyclodienes, such as 3-methyltricyclo[5.2.1.0.2.6]-3,8-decadiene or mixtures thereof. Hexa-1,5-diene, 5-ethylidenenorbornene and dicyclopentadiene are preferred. The diene content of the EPDM rubbers is preferably from 0.5 to 50, in particular from 1 to 8,% by weight, based on the total weight of the rubber. EPM and EPDM rubbers may preferably also be grafted with reactive carboxylic acids or derivatives thereof. Examples of these are acrylic acid, methacrylic acid and derivatives thereof, eg. glycidyl (meth)acrylate, and maleic anhydride.

A further group of preferred rubbers comprises copolymers of ethylene with acrylic acid and/or methacrylic acid and/or with the esters of these acids. The rubbers may additionally contain dicarboxylic acids, such as maleic acid and fumaric acid, or derivatives of these acids, for example esters and anhydrides, and/or epoxy-containing monomers. These dicarboxylic acid derivatives and epoxy-containing monomers are preferably incorporated in the rubber by adding to the monomer mixture monomers containing dicarboxylic acid groups and epoxy groups, respectively, of the general formulae I or II or III or IV

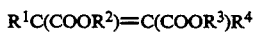  (I)

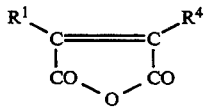  (II)

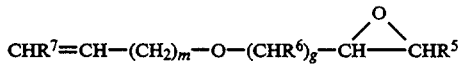  (III)

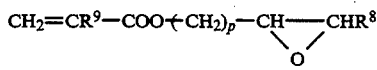  (IV)

where $R^1$ to $R^9$ are each hydrogen or alkyl of 1 to 6 carbon atoms, m is an integer of from 0 to 20, g is an integer of from 0 to 10 and p is an integer of from 0 to 5.

$R^1$ to $R^9$ are each preferably hydrogen, m being 0 or 1 and g being 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and epoxy-containing esters of acrylic acid and/or methacrylic acid, such as glycidyl acrylate or glycidyl methacrylate, and the esters with tertiary alcohols, such as tert-butyl acrylate. Although the latter have no free carboxyl groups, their behavior resembles that of the free acids and they are therefore referred to as monomers having latent carboxyl groups.

The copolymers advantageously consist of from 50 to 98% by weight of ethylene and from 0.1 to 20% by weight of epoxy-containing monomers and/or methacrylic acid and/or anhydride-containing monomers, the remaining amount being (meth)acrylates.

Copolymers of from 50 to 98, in particular from 55 to 95,% by weight of ethylene, from 0.1 to 40, in particular from 0.3 to 20,% by weight of glycidyl acrylate and/or glycidyl methacrylate, (meth)acrylic acid and/or maleic anhydride and from 1 to 45, in particular from 10 to 40,% by weight of n-butyl acrylate and/or 2-ethylhexyl acrylate are particularly preferred.

Other preferred esters of acrylic and/or methacrylic acid are the methyl, ethyl, propyl, isobutyl and tert-butyl esters.

Vinyl esters and vinyl ethers may also be used as comonomers.

The ethylene copolymers described above can be prepared by processes known per se, preferably by random copolymerization at high pressure and elevated temperatures. Corresponding processes are generally known.

Other preferred elastomers are emulsion polymers, the preparation of which is described, for example, by Blackley in the monograph "Emulsion Polymerization". The emulsifiers and catalysts which may be used are known per se.

In principle, homogeneous elastomers or elastomers having a shell structure may be used. The shell-like structure is determined by the order of addition of the individual monomers; the morphology of the polymers is also influenced by this order of addition.

Acrylates, eg. n-butyl acrylate and 2-ethylhexyl acrylate, corresponding methacrylates, butadiene and isoprene and mixtures thereof may be mentioned here merely as typical examples of monomers for the preparation of the rubber moiety of the elastomers. These monomers may be copolymerized with further monomers, eg. styrene, acrylonitrile, vinyl ethers and further acrylates or methacrylates, such as methyl methacrylate, methyl acrylate, ethyl acrylate and propyl acrylate.

The flexible or rubber phase (having a glass transition temperature of less than 0° C.) of the elastomers may be the core, the outer shell or a middle shell (in the case of elastomers having a structure comprising more than two shells); in the case of multishell elastomers, it is also possible for a plurality of shells to consist of a rubber phase.

If, in addition to the rubber phase, one or more rigid components (having glass transition temperatures of more than 20° C.) are present in the elastomer, these components are generally prepared by polymerization of styrene, acrylonitrile, methacrylonitrile, α-methylstyrene, p-methylstyrene, acrylates and methacrylates, such as methyl acrylate, ethyl acrylate and methyl methacrylate, as main monomers. Here too, relatively small amounts of further comonomers may also be used.

In some cases, it has proven advantageous to use emulsion polymers which have reactive groups at the surface. Such groups are, for example, epoxy, carboxyl, latent carboxyl, amino or amido groups and functional groups which can be introduced by the concomitant use of monomers of the general formula

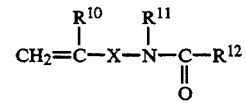

where $R^{10}$ is hydrogen or $C_1$-$C_4$-alkyl, $R^{11}$ is hydrogen, $C_1$-$C_8$-alkyl or aryl, in particular phenyl, $R^{12}$ is hydrogen, $C_1$-$C_{10}$-alkyl, $C_6$-$C_{12}$-aryl or —$OR^{13}$ $R^{13}$ is $C_1$-$C_8$-alkyl or $C_6$-$C_{12}$-aryl, each of which may be substituted by O— or N-containing groups, X is a chemical bond, $C_1$-$C_{10}$-alkylene or $C_6$-$C_{12}$-arylene or

Y is O—Z or NH—Z and

Z is $C_1$-$C_{10}$-alkylene or $C_6$-$C_{12}$-arylene.

Graft monomers described in EP-A 208 187 are also suitable for the introduction of reactive groups at the surface.

Further examples are acrylamide, methacrylamide and substituted esters of acrylic acid or methacrylic acid, such as N-t-butylaminoethyl methacrylate, N,N-dimethylaminoethyl acrylate, N,N-dimethylaminomethyl acrylate and N,N-diethylaminoethyl acrylate.

The particles of the rubber phase may also be crosslinked. Examples of monomers having crosslinking activity are buta-1,3-diene, divinylbenzene, diallyl phthalate and dihydrodicyclopentadienyl acrylate, as well as the compounds described in EP-A 50 265.

Graft-linking monomers, i.e. monomers having two or more polymerizable double bonds which react at different rates in the polymerization, may also be used. Preferably used compounds are those in which at least one reactive group polymerizes at about the same rate as the other monomers, whereas the other reactive group (or reactive groups) polymerizes (polymerize), for example, substantially more slowly. The different polymerization rates result in a certain proportion of unsaturated double bonds in the rubber. If a further phase is subsequently grafted onto such a rubber, some or all of the double bonds present in the rubber react with the graft monomers with formation of chemical bonds, i.e. the phase grafted on is linked to the grafting base at least partially by chemical bonds.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate or the corresponding monoallyl compounds of these dicarboxylic acids. There is also a large number of further suitable graft-linking monomers; for further details, reference may be made, for example, to U.S. Pat. No. 4,148,846.

In general, the proportion of these crosslinking monomers in the polymeric impact modifier is up to 5, preferably not more than 3, by weight, based on said polymeric impact modifier.

Some preferred emulsion polymers are stated below. Primary examples of these are graft polymers which have a core and at least one outer shell and possess the following composition:

| Type | Monomers for the core | Monomers for the shell |
|---|---|---|
| I | Buta-1,3-diene, isoprene, n-butyl acrylate, ethylhexyl acrylate or mixtures thereof | Styrene, acrylonitrile, methyl methacrylate |
| II | As for I but with the concomitant use of crosslinking agents | As for I |
| III | As for I or II | N-butyl acrylate, ethyl acrylate, methyl acrylate, buta-1,3-diene, isoprene, ethylhexyl acrylate |
| IV | As for I or II | As for I or III but with the concomitant use of monomers having reactive groups as described herein |
| V | Styrene, acrylonitrile, methyl methacrylate or mixtures thereof | First shell comprising monomers as described under I and II for the core Second shell as described under I or IV for the shell |

Instead of graft polymers having a multishell structure, homogeneous, i.e. one-shell, elastomers of buta-1,3-diene, isoprene and n-butyl acrylate or copolymers thereof may also be used. These products, too, can be prepared by the concomitant use of crosslinking monomers or monomers having reactive groups.

Examples of preferred emulsion polymers are n-butyl acrylate/(meth)acrylic acid, n-butyl acrylate/glycidyl acrylate or n-butyl acrylate/glycidyl methacrylate copolymers, graft polymers having an inner core of n-butyl acrylate or based on butadiene and an outer shell of the abovementioned copolymers and copolymers of ethylene with comonomers which donate reactive groups.

The elastomers described may also be prepared by other conventional processes, for example by suspension polymerization.

Further preferred rubbers are polyurethanes, as described in EP-A 115 846, EP-A 115 847, EP-A 116 456, EP-A 117 664 and EP-A 327 384. Such products are commercially available, for example, under the names Desmopan ® (Bayer AG) or Elastollan ® (Elastogran Polyurethane GmbH).

Silicone rubbers, as described in DE-A 37 25 576, EP-A 235 690, DE-A 38 00 603 and EP-A 319 290, are also preferred.

Mixtures of the abovementioned rubber grades may of course also be used.

The novel thermoplastic molding materials may be prepared by processes known per se, by mixing the starting components an a conventional mixing apparatus, such as an extruder, a Brabender mill or a Banbury mill, and then carrying out extrusion. After the extrusion, the extrudate may be cooled and comminuted. It is also possible to premix individual components and then to add the remaining starting materials individually and/or likewise in the form of a mixture. The mixing temperatures are as a rule from 230° to 290° C.

In a preferred procedure, component B) and, if required, conventional additives can be mixed with a polyester prepolymer and the mixture can be granulated. The granules obtained are then subjected to continuous or batchwise solid-phase condensation under inert gas at below the melting point of the component A) until the desired viscosity is obtained.

The novel thermoplastic molding materials have good flameproof properties in combination with very good mechanical and electrical properties. They are suitable for the production of fibers, films and moldings.

EXAMPLES

Preparation of the Copolyesters

Component A/1

In a reaction vessel, 63 kg of dimethyl terephthalate, 48.7 kg of 1,4-butanediol, 7.0 kg of the dimethyl ester of a C36 dimeric acid (Priplast ®3008 from Emery Ind. Inc.), 8 kg of toluene as an entraining agent and 9.06 g of tetrabutyl orthotitanate (TBOT) were heated for 2 hours at 190° C., the resulting methanol being distilled off continuously.

The transesterification product was condensed in a continuous precondensation zone with the continuous addition of a total of 59 g of TBOT at 90° C. and from 3 to 8 mmHg in a residence time of 5 minutes.

The precondensate was separated from the butanediol vapor in a separator at 250° C. and from 3 to 5 mmHg and was extruded, solidified in a water bath and granulated. The viscosity number VN of the copolyester prepolymer was 35 ml/g (measured in a 0.5% by weight solution in phenol/o-dichlorobenzene (weight ratio 1:1) at 25° C.).

In a solid-phase postcondensation (tumbler mixer), the granules obtained were heated under nitrogen at 210° C. for 36 hours until the viscosity number was 140 ml/g. The copolyester based on polybutylene terephthalate contained 10% by weight of the dimethyl ester of a C36 dimeric acid as a cocomponent.

Component A/2

In a reaction vessel, 59.5 kg of dimethyl terephthalate, 48.7 kg of 1,4-butanediol, 10.5 kg of the dimethyl ester of a C36 dimeric acid (Priplast ®3008 from Emery Ind. Inc.), 8 kg of toluene as an entraining agent and 9.06 g of tetrabutyl orthotitanate (TBOT) were heated for 2 hours at 190° C., the resulting methanol being distilled off continuously.

The transesterification product was condensed in a continuous precondensation zone with the continuous addition of a total of 59 g of TBOT at 290° C. and from 3 to 8 mmHg in a residence time of 5 minutes.

The precondensate was separated from the butanediol vapor in a separator at 250° C. and from 3 to 5 mmHg and was extruded, solidified in a water bath and granulated.

In a solid-phase condensation (tumbler mixer), the granules obtained were heated under nitrogen at 210° C. for 36 hours until the viscosity number was 140 ml/g. The copolyester based on polybutylene terephthalate contained 15% by weight of the dimethyl ester of the C36 dimeric acid as a cocomponent.

Component A/V (For Comparison)

Polybutylene terephthalate (Ultradur ®B4500 from BASF AG): VN=35 ml/g

Preparation of the Molding Materials

Component A/1 or A/2 or A/V was mixed with a mixture of $Mg_3Ca(CO_3)_4$ (huntite) and $Mg_5(CO_3)_4(OH)_2 \cdot 4 H_2O$ (hydromagnesite) in a weight ratio of huntite to hydromagnesite of 2:1 (component B) and cut glass fibers (component C) in a twin-screw extruder (ZSK 53 from Werner & Pfleiderer) at 260° C. (30 kg/h throughput, 140 rpm), the resulting mixture was extruded, the extrudate was cooled and granulated and the granules were dried at 80° C. under reduced pressure for 8 hours and then injection molded at 260° C. to give test specimens.

The fire test was carried out according to UL 94 on 1/16 inch test specimens after conventional conditioning, and the impact strength was determined according to DIN 53 453 and the elongation at break according to DIN 53 455.

TABLE

| Example | Composition (% by weight) | | | Elongation at break | Impact strength (kJ/m²) | UL 94 (1/16″) |
|---|---|---|---|---|---|---|
| 1 | 45 A/1 | 45 B | 10 C | 1.5 | 17 | V-0 |
| 2 | 45 A/2 | 45 B | 10 C | 1.6 | 20 | V-0 |
| 3 | 50 A/2 | 40 B | 10 C | 2.0 | 24 | V-0 |
| V1 | 45 A/V | 45 B | 10 C | 0.7 | 10 | V-0 |
| V2 | 50 A/V | 40 B | 10 C | 0.8 | 14 | V-2 |
| V3 | 70 A/V | — | 30 C | 2.5 | 30 | V- |
| V4 | 70 A/2 | — | 30 C | 4.0 | 38 | V- |

A smaller amount of flameproofing agent is required for classification as V0 in the case of the copolyester in comparison with PBT (V2) (Example 3).

Compared with PBT, in the compound the elongation at break and impact strength are increased to a greater extent

| Example 2: | Elongation at break = | 1.6 | Impact strength = 20 |
|---|---|---|---|
| Example V2: | Elongation at break = | 0.7 | Impact strength = 10 |
| | | = 128% | Impact strength = 100% | than was to be expected in the case of reinforcement with glass fibers only

| Example V4: | Elongation at break = | 4.0 | Impact strength = 38 |
|---|---|---|---|
| Example V3: | Elongation at break = | 2.5 | Impact strength = 30 |
| | | = 60% | = 26%. |

We claim:

1. A thermoplastic molding material containing, as essential components,
   A) 10–80% by wt. of a copolyester based on polyalkylene terephthalates, which contains from 5 to 25% by weight, based on A), of a dimeric acid of 7 to 52 carbon atoms as a co-component, and
   B) 20–70% by wt. of a mixture of carbonates of metals of the 2nd main group of the Periodic Table of Elements.

2. A thermoplastic molding material as defined in claim 1, in which component A) is a copolyester based on polyethylene terephthalate or polybutylene terephthalate.

3. A thermoplastic molding material as defined in claim 1, in which a mixture of
   b₁) a magnesium calcium carbonate of the formula $Mg_xCa_y(CO_3)_{x+y} \cdot m\ H_2O$, where x and y are each from 1 to 5, $x/y \geq 1$ and $m \geq 0$, and
   b₂) a basic magnesium carbonate of the formula $Mg_n(CO_3)_v(OH)_{2n-2v} \cdot w\ H_2O$, where n is from 1 to 6, v is greater than 0 and less than 6, $n/v > 1$ and $w \geq 0$, is used as component B), the ratio of b₁):b₂) being from 1:1 to 3:1.

4. A thermoplastic molding material as defined in claim 1, in which the copolyester A) contains from 10 to 15% by weight, based on A), of a dimeric acid as a co-component.

5. A thermoplastic molding material as defined in claim 1, in which the co-component of the copolyester A) is a dimeric acid of 36 to 44 carbon atoms.

6. A molding obtained from a thermoplastic molding material as defined in claim 1.

7. A thermoplastic molding material as defined in claim 1, wherein one of the metals forming the mixture of carbonates of component B is magnesium.

8. A thermoplastic molding material as defined in claim 1, wherein one of the carbonates of component B is dolomite or huntite.

9. A thermoplastic molding material as defined in claim 1, wherein one of the carbonates of component B is huntite.

* * * * *